Patented July 22, 1941

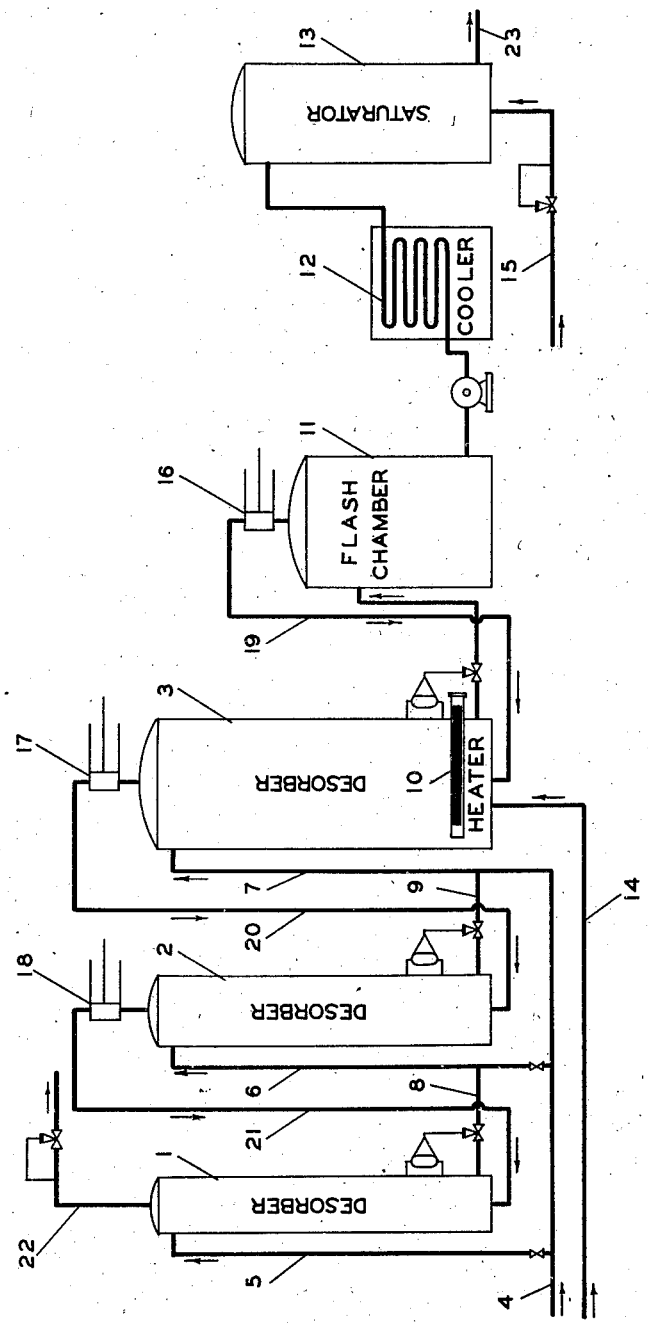

2,249,884

UNITED STATES PATENT OFFICE 2,249,884

PROCESS FOR DEGASSING LIQUIDS

Samuel C. Carney, Bartlesville, Okla., assignor to Phillips Petroleum Company, a corporation of Delaware Application December 9, 1938, Serial No. 244,866

6 Claims. (Cl. 183—114.5)

My invention relates to the desorption of dissolved gas from a liquid, and more particularly to the stabilization of crude oil for transportation or storage by removing undesired dissolved lighter components which may be methane, ethane, propane, hydrogen, hydrogen sulphide, oxygen, water vapor and the like.

In the known physical processes for accomplishing the above, various modifications of the known rectifying process are used, all of which involve boiling of the liquid, and, to greater or less extent, the use of reflux condensers. It is also known in the art to remove hydrogen sulphide by reduction of pressure, but this is only used on partly finished distillates, and involves either loss or recondensation of valuable hydrocarbons which have also been removed with the hydrogen sulphide. My process does not involve distillation, and while it uses both heating and pressure reduction, the temperatures used are lower and the reduced pressures higher than in known processes. The reason is that I use not only lowering of pressure but also lowering of partial pressure, and thus at a reasonably low operating pressure attain an extremely low partial pressure. As to the heating, I utilize a minimum of direct heating and in addition to this utilize heat of solution of vapors and also heat resulting from their compression.

Thus, the primary object of the present invention is to provide an improved process for removing undesired dissolved lighter components and gases from crude oil and in general to prepare the same for storage or transportation.

Other objects and advantages will appear from the more detailed description of the invention following hereinafter.

I shall describe my improved process by reference to the drawing, as applied to crude oil for the removal of methane, ethane, propane, hydrogen, hydrogen sulphide, air and water vapor. Though it may be that not all of these are present, the principle for removal of any or all of them is the same, differences in character of raw feed being cared for by adjustments in operation.

The accompanying drawing is a diagrammatic elevation of an apparatus suitable for carrying out the present invention.

Referring to the drawing, units 1, 2 and 3 are plate columns herein called desorbers, and may be sections of a single column if desired. The crude oil, coming from traps at about 50# per square inch absolute pressure, to which it has been reduced after coming from a trap at a higher pressure, for example 300# per square inch absolute, enters the system through a pipe 4. A small part of the oil, as will later be described, about 10 per cent of the total, enters the top of desorber 1 through a pipe 5, another part entering desorber 2 through a pipe 6. All the remainder enters desorber 3 through a pipe 7. The entire oil ultimately enters the top of desorber 3, for oil from the base of desorber 1 flows by a pipe 8 and pipe 6 into the top of desorber 2, and oil from the base of desorber 2 flows by pipe 9 and pipe 7 to the top of desorber 3. The base of desorber 3, depending on the character of the crude, may or may not be heated by a heating unit 10. Oil from the base of desorber 3 flows to a flash chamber 11 in which a partial vaporization and consequent cooling is brought about by reduction of pressure. From flash chamber 11 the oil flows through a cooler 12 to a saturator 13 in which volatile hydrocarbons available from other sources are added through a pipe 15 in amount sufficient to bring the total vapor pressure to about one atmosphere so that a minimum of air will be dissolved during its transportation and storage. A pipe 14 serves to introduce vapors from an extraneous source into desorber 3. Gas and vapors from units 11, 3 and 2 are separately compressed and delivered in countercurrent direction to the passage of oil from unit to unit. For accomplishing this delivery, pipes 19, 20 and 21, containing compressors 16, 17 and 18, respectively, connect the tops of units 11, 3 and 2 and the bottoms of units 3, 2 and 1, respectively. Undesirable gases are removed from the top of desorber 1 through a valve-controlled pipe 22 at the top thereof. The degassed oil product leaves saturator 13 through a pipe 23.

The present method shows the character and power of the force or mechanism which my process uses, instead of the distillation by heat of the prior art. I continuously and intentionally contact liquid with mixed gas or vapor with which it is not in equilibrium and so select conditions that the known inherent tendency of such two phase systems to seek equilibrium will change the compositions of both phases in the desired way. It will be plain that the oil, no matter how large its amount, cannot dissolve any methane from the gas. It will be plain also that it will dissolve large amounts of everything else. So that if I do not wish to dissolve ethane, I must use one or both of two methods. First, I may limit the amount of oil used as solvent, or reduce the operating pressure or both so that the solvent used will dissolve selectively, propane and heavier, or butane and heavier, thus providing a way of escape for undesired lighter components.

It is true, as known in the art, that when using as solvent an oil containing propane and heavier, all gas passing through such solvent will also contain the equilibrium amount of these. But the prior art has considered this fact substantially to prohibit the use of such oil as a solvent, overlooking the more important fact that from a gas with higher partial pressures of these soluble components, such an oil must and will dissolve large amounts of them, thus removing the necessity of their further treatment. Material dissolved in the solvent qualitatively limit the composition of the exit gas, but, as in the illustration, such oils retain capacity to dissolve many times the original content of them, if their partial pressure in the second gas contact be high.

If producing crude oil in Persia, Brazil or other points remote from markets, it is possible by the present invention to remove methane and ethane and replace them by the very much larger amounts of butane and heavier hydrocarbons required to give the oil the same vapor pressure, with much greater economy than the practice of entirely separate production of natural gasoline. It is known to blend natural gasoline with crude oil, but not to put it into solution from the vapor phase using this solution at the same time as a means of removing methane and other undesirables.

Referring again to the diagrammatic illustration of the application of the invention, starting at the base of desorber 3, since it is here that the ultimate result is attained, this desorber operates at a relatively low pressure, for example, from 10# per square inch absolute to one atmosphere. In consideration of the composition of the crude oil and the operating pressure, the operating temperature at its base is maintained at such a value that the sum of the partial vapor pressures of the components which it is desired to retain shall equal the operating pressure. The composition of the crude in a given case is relatively constant but its volatility may be increased by the addition at this point, if desirable, of fractions recovered from trap gases. There are four operating factors at this point and the finished composition including any added material, is one of them but is also the result of the operation. Obviously, the greater the initial volatility of the crude and the larger the amount of volatile material added, the higher may be the operating pressure and the lower may be the operating temperature. So operating temperature and pressure are two more factors both qualitative. The fourth factor is quantitative in character and consists in the volume of vapor delivered by compression into the base of desorber 3 from evaporator 11, plus any vapors added through pipe 14. The volume of vapor required for desorption is independent of the concentration of components desorbed. Since I use a vapor entirely soluble in the liquid phase, its latent heat of solution will itself increase the operating temperature of desorber 3.

As indicating the range of the variables mentioned, it is a fact very seldom considered, that even in the case of a light crude oil, the sum of the vapor pressures of butane and heavier which are in the crude at 50# per square inch trap pressure, are on the order of 5# per square inch absolute at 80° F., while propane and heavier exert pressure of not quite one atmosphere. On many heavier crudes the sum of the vapor pressures of those is far lower. So, operating temperature may range from 80 to 100° F. on light crudes and up to 150° F. on very heavy ones, in order to give an operating pressure in desorber 3 not far from one atmosphere.

All the oil ultimately enters the top of desorber 3 and flows down over its plates. In this desorber, it is treated by a counter current flow of vapor from evaporator 11, which may operate at a pressure 2 to 5# per square inch lower, and vapor from pipe 14. This gives a very low compression ratio, permitting the compression to be done most economically by a pressure blower. It is desirable, especially with heavy crudes and when starting operation, to add through pipe 14 as a vapor a sufficient amount of light material, butanes preferably, which will tend to remain in the system and permit lower operating temperatures. In cases where continually available, and nature of the crude permits it, substantial amounts of natural gasoline as a vapor may be introduced continuously by pipe 14, thus reducing amount compressed. The amount of vapor so required varies with the four operating factors described but when these are once fixed, it is a constant and may easily be arranged to lie within the limits of 30 to 50 cubic feet per barrel by the setting of operating pressure and temperature.

As described in the above theoretical discussion, this vapor removes lighter materials by reducing their partial pressure in the gas phase and the only requisite is that a sufficient volume be used. No light components desorbed on the lower plates can be re-dissolved on upper plates for the oil is already giving them off. The gas leaving the top of desorber 3 will therefore contain only a small part of the vapors introduced at its base for most of them will dissolve in the liquid to replace the partial vapor pressure of lighter constituents desorbed. So the gas to be compressed from the top of desorber 3 into the base of desorber 2 is much less, and again a blower may be used if desired.

The liquid phase in desorber 2 consists of the oil from the base of desorber 1 and to this may be added, depending on pressure chosen, a small or a very large stream of untreated oil from pipe 4 entering by pipe 6. The purpose of desorber 2 which may be of smaller diameter than that of desorber 3 is only partly to remove lighter constituents from its liquid phase and chiefly to reduce the volume of gas to be compressed into desorber 1. Its pressure is usually from 5 to 10 pounds per square inch higher than that of desorber 3 but it is heated only by heat of solution and so operates at a lower temperature. The amount of oil introduced to its top is so regulated, together with its pressure, as is known in the art of absorption, that, for example, substantially all the pentane and heavier which an oil of that character is capable of absorbing shall be removed from the gas stream. This absorption will, as shown, eliminate an amount of lighter material of similar vapor pressure potential.

Gas from the top of desorber 2 is compressed to the base of desorber 1 which is always of small diameter. The pressure of desorber 1 is definitely related to that of the trap from which the crude was taken. It may have about the same pressure as that of the trap or may be a little lower or a little higher depending on the result desired, for its function is that of final control of the composition of the desorbed gas from the process. Clearly the higher the pressure and the lower the temperature here, the lower will be the content of the desorbed gas in hydrocarbons such as butane and heavier. Its limit in this respect is a gas having the concentration of these approximately the same as that in the gas at the trap from which the crude oil comes. Undenuded oil is used as solvent because it cannot absorb methane and but little of any other light constituent because already saturated with them. Obviously, if all the oil to be treated entered here it would reabsorb all the materials desorbed in the succeeding desorbers. The prior art solved this by heating all the oil to a temperature so high that it could not reabsorb desorbed material. This process teaches, on the other hand, that this oil cannot absorb any methane but will instead give off methane. And while leaving it qualitatively capable of absorbing, for example, some ethane, hydrogen sulphide, and propane at their higher partial pressures in the gas at this point, it so limits the quantity of oil that the amount of an undesirable constituent absorbed, for example, ethane or hydrogen sulphide, is a relatively small part of the total escaping from the top of desorber 1. Since the function of desorber 1 is thus qualitative in character, it is indicated in principle to cool the oil entering here by refrigeration and further to reduce its volume. As contrasted with the method of the prior art, this is the exact reverse, for all undesired material removed by these rectifying methods has to pass the entire oil stream on its way out and to make it possible so to pass, the entire oil stream must be heated to a high temperature. This heating vaporizes so much desirable material that the whole operation must be done at high pressure.

It is quite true that the gas leaving the top of desorber 1 is not a dry gas, free from natural gasoline constituents. But it does have approximately the composition of the gas released at a trap having the pressure of desorber 1. For this reason in the modern production operations the need of a column (not shown) ahead of desorber 1 and operated at 300 to 800# per square inch is indicated.

Since the practical principle I have stated holds for any pressure, at least up to the point of retrograde condensation, and any kind of oil, methane removed at any intermediate lower pressure will not be reabsorbed in the same oil at any higher pressure up to the pressure which originally put it into solution. Methane is the controlling factor in the volume of gas handled in a degassing operation and the higher the pressure at which most of it is removed, the cheaper the operation. On the other hand, the lower the pressure at which its removal, and that of hydrogen sulphide, takes place, the more complete is that removal.

And where in the prior art methane is the chief detriment to forming a reflux and is the principle item which enforces costly high pressures and temperatures, I thus use methane as the diluent to permit the escape of the other undesired materials.

The saturator 13 is not an essential part of this process. I point out, however, that if methane and ethane be removed from a crude by this or any other process, without the addition, as by pipe 14, of other material derived from high pressure gas to replace them, the crude will be left with an absolute vapor pressure which may be as low as 6 or 8 pounds per square inch absolute. This will result in a higher partial pressure of air over its surface in subsequent storage and handling and the consequent solution of more oxygen to increase refinery corrosion. It is better in principle if not enough butane and heavier be available to bring the vapor pressure back to one atmosphere, to add in saturator 13 enough methane free from hydrogen sulphide to bring back the vapor pressure. Also, unless modern methods of avoiding evaporation are used, it is best in principle any way to leave room for enough methane to give a reasonable flexibility of vapor pressure to minimize evaporation losses of heavier materials in further storage and handling. In the case of a sweet crude the operation may be managed to leave in this much methane and ethane. In case of hydrogen sulphide removal, methane may be added by use of a sweet gas in saturator 13.

It will be plain that in operating on crude from traps at modern high pressures, the pressure should be reduced in stages, the gas from each stage of lower pressure being compressed as shown, through a desorber fed with a limited stream of oil from the stage of next higher pressure.

In the case of motor fuel to be handled by pipe line from a refinery, in which case it is desirable to remove dissolved oxygen to avoid corrosion, two desorbers using the principles described are probably sufficient.

The principles are also adapted to the degassing of pressure distillate from regular cracking operations in cases where this is distilled in apparatus separate from the cracking plant, and cases for its use may arise in polymerizing operations where liquids are removed from a cycle in which they are in equilibrium with a gas phase at high pressure.

An important practical point is that extreme flexibility is available in the engineering arrangement. If on a unitary operation on crude, a maximum increase in gravity may be made or on some crudes the gravity may be kept lower, solely by choice of temperature and pressure at desorber 3. If operated in connection with a poly plant, all gas may be handled at the highest trap pressure and instead of having to compress to a high pressure all the low pressure gas, only about half of it is so compressed, the remainder dissolving in the crude. In every case water vapor is removed by the same principle of additive vapor pressure now used in dehydrating propane, but more easily because at a lower pressure.

If butane and lighter are to be used as poly feed, there is full opportunity either to leave in, put into, or take out of the crude such material as required to balance up the operation, letting the rest go to the refinery.

This process pushes out large amounts of methane at higher pressures by compressing another gas and uses usefully all the heat of compression and heat of solution, thus saving cooling coils on compressor discharges. The little heating required may be done by direct first coils eliminating boiler plant, and with care, the crude degassing may be done without cooling water, except for final cooling of a heavy crude and this may not be necessary if it can go direct to a pipe line.

While I have shown my invention as embodied in specific form and as operating in a specific manner for the purpose of illustration, it should be understood that I do not limit my invention thereto, since various modifications will suggest themselves to those skilled in the art without departing from the spirit of the invention, the scope of which is set forth in the annexed claims.

I claim:

1. The process of desorbing a dissolved gas from crude oil which comprises passing the crude oil through a plurality of contacting zones in series, the zones being maintained under successively decreasing pressures, wherein the crude oil is contacted with gas, passing the crude oil from the final contacting zone into a flash zone maintained under lower pressure than the pressure of the final contacting zone, returning gas liberated in the flash zone to the final contacting zone, the contacting gas being passed from a subsequent zone to a preceding zone in respect to the crude oil flow, thereby disturbing the equilibrium of the crude oil and gas dissolved therein, and causing the desorption of the dissolved gas from the crude oil.

2. The process of desorbing a dissolved gas from crude oil which comprises passing the crude oil through a plurality of contacting zones in series, the zones being maintained under successively decreasing pressures wherein the crude oil is contacted with gas, heating the crude oil in the final contacting zone, passing the crude oil from the final contacting zone into a flash zone maintained under lower pressure than the pressure of the final contacting zone, returning gas liberated in the flash zone to the final contacting zone, the contacting gas being passed from a subsequent zone to a preceding zone in respect to crude oil flow, thereby disturbing the equilibrium of the crude oil and gas dissolved therein, and causing the desorption of the dissolved gas from the liquid.

3. The process of desorbing a dissolved gas from crude oil which comprises passing the crude oil through a plurality of contacting zones in series, the zones being maintained under successively decreasing pressures, the zone of highest pressure receiving only a portion of the crude oil being processed while the zone of next lower pressure receives the remaining crude oil, wherein the crude oil is contacted with gas, passing the crude oil from the final contacting zone into a flash zone maintained under lower pressure than the pressure of the final contacting zone, returning gas liberated in the flash zone to the final contacting zone, the contacting gas being passed from a subsequent zone to a preceding zone in respect to the crude oil flow, thereby disturbing the equilibrium of the crude oil and gas dissolved therein, and causing the desorption of the dissolved gas from the crude oil.

4. The process of desorbing a dissolved gas from crude oil which comprises passing the crude oil through a plurality of contacting zones in series, the zones being maintained under successively decreasing pressures, wherein the crude oil is contacted with gas, passing the crude oil from the final contacting zone into a flash zone maintained under lower pressure than the pressure of the final contacting zone, returning gas liberated in the flash zone to the final contacting zone after raising the pressure of the gas to that existing in the final contacting zone, the contacting gas being passed from a subsequent zone to a preceding zone in respect to crude oil flow with the contacting gas being compressed to the pressure of each preceding zone, thereby disturbing the equilibrium of the crude oil and gas dissolved therein and causing the desorption of the dissolved gas from the crude oil.

5. The process of desorbing a dissolved gas from crude oil which comprises passing the crude oil through a plurality of contacting zones in series, the zones being maintained under successively decreasing pressures, wherein the crude oil is contacted with gas, passing the crude oil from the final contacting zone into a flash zone maintained under lower pressure than the pressure of the final contacting zone, returning gas liberated in the flash zone to the final contacting zone, the contacting gas being passed from a subsequent zone to a preceding zone in respect to crude oil flow, thereby disturbing the equilibrium of the crude oil and gas dissolved therein thus causing the desorption of the dissolved gas from the crude oil and removing desorbed gas from the top of the highest pressure contacting zone.

6. The process of desorbing a dissolved gas from crude oil which comprises passing the crude oil through a plurality of contacting zones in series, the zones being maintained under successively decreasing pressures, wherein the crude oil is contacted with gas, passing the crude oil from the final contacting zone into a flash zone maintained at a pressure which equals the sum of the partial vapor pressures of the liquid components desired to be retained in the solution, returning gas liberated in the flash zone to the final contacting zone, the contacting gas being passed from a subsequent zone to a preceding zone in respect to the crude oil flow, thereby disturbing the equilibrium of the crude oil and gas dissolved therein, and causing the desorption of the dissolved gas from the crude oil.

SAMUEL C. CARNEY.